United States Patent [19]

Hector et al.

[11] Patent Number: 4,720,789
[45] Date of Patent: Jan. 19, 1988

[54] VIDEO EXERCISE OR GAME FLOOR CONTROLLER WITH POSITION INDICATING FOOT PADS

[75] Inventors: Roger D. Hector, Saratoga; Nolan K. Bushnell, Woodside; Howard Delman, San Jose; Edward Rotberg, Los Altos; Jon Kinsting, San Jose, all of Calif.

[73] Assignee: Bally Manufacturing Corporation, Chicago, Ill.

[21] Appl. No.: 794,161

[22] Filed: Oct. 31, 1985

[51] Int. Cl.⁴ .................. G06F 15/44; A63B 23/04
[52] U.S. Cl. ................................ 364/410; 272/96; 273/148 B; 273/DIG. 28
[58] Field of Search ........ 273/148 B, 85 G, DIG. 28; 272/DIG. 5, 94, 96; 200/86.5; 364/410

[56] References Cited

U.S. PATENT DOCUMENTS

| | | | |
|---|---|---|---|
| 2,938,977 | 9/1953 | Koenig | 200/86 R |
| 3,825,277 | 7/1974 | Steinback | 200/86 R |
| 4,037,069 | 7/1977 | Gonzalez et al. | 200/86 R |
| 4,121,488 | 10/1978 | Akiyama | 84/101 |
| 4,441,097 | 4/1984 | Anderson | 340/365 A |
| 4,488,017 | 12/1984 | Lee | 200/5 R |
| 4,489,938 | 12/1984 | Darzinskis | 272/142 |
| 4,497,989 | 2/1985 | Miller | 200/86 R |
| 4,512,567 | 4/1985 | Phillips | 273/148 B X |
| 4,630,817 | 12/1986 | Buckley | 273/148 B X |

OTHER PUBLICATIONS

Lord, M. et al, "Video Aid to Rehabilitation of Standing Balance", *Med. & Biol. Eng. & Comput.*, vol. 20, No. 2, May 1982, 281–285.

Forman, T., "Gamers Get Physical with Amiga's Joyboard", *Electronic Games*, Mar. 1984, 84–5.

*Primary Examiner*—Jerry Smith
*Assistant Examiner*—Clark A. Jablon
*Attorney, Agent, or Firm*—Michael B. McMurry

[57] ABSTRACT

Operation of a video game or an exercise system utilizing a video display is enhanced by a floor controller utilizing weight sensitive pads that allows an operator to input information into the system by locating his feet in specific portions of the floor controller. The system includes an interface circuit which obtains foot location signals from the floor controller and transmits this information to a system microprocessor which in turn is used to control the video display. The system can also include light segments that are under control of the microprocessor and which are associated with each of the weight sensitive pads.

27 Claims, 4 Drawing Figures

VIDEO EXERCISE OR GAME FLOOR CONTROLLER WITH POSITION INDICATING FOOT PADS

TECHNICAL FIELD OF THE INVENTION

The invention relates to the field of games or exercise systems using video displays and in particular to such systems that are controlled, at least in part by the operator's feet.

BACKGROUND OF THE INVENTION

Video games, whether the home or arcade variety have been controlled by a number of different methods including buttons, joysticks, trackballs and other devices that can be manipulated by the hands. Also there have been games that utilize some form of foot control such as the video car racing games where the speed of the car is controlled by a foot pedal. Another example of foot control of a game is provided in U.S. Pat. No. 4,488,017 which discloses a multi-directional control unit that is in effect a joystick operated by the operator's feet.

However, most of the prior art video games have required little in the way of physical activity from the operators other than occasional rapid hand movement. With the increasing emphasis on fitness in our society, it can be considered desirable to combine the entertainment value of video games with the benefits of physical exercise.

SUMMARY OF THE INVENTION

It is therefore an object of the invention to provide a video game controller in which a game or exercise equipment having a video display can be controlled by the placement of the operator's feet.

It is a further object of the invention to provide a video game or exercise system that includes: a video display, a processor, an input interface connected to the processor and a floor controller connected to the input interface for producing signals representing the location of the operator's feet and effective to control the video game or exercise equipment.

An additional object of the invention is to provide a video floor controller composed of an array of weight sensitive pads. The controller can also include light segments encompassing each of the pads that are selectively lighted by a microprocessor.

Another object of the invention is to provide a video game or exercise apparatus that includes a floor controller wherein microprocessor created objects such as bugs are displayed on a CRT and the microprocessor in response to foot location signals from the floor controller generates location objects such as a footprint on the CRT. The object of the game is for the operator, by placing his feet in the correct locations on the floor controller, to cover the microprocessor generated objects with the location object.

DETAILED DESCRIPTION OF THE INVENTION

Figure 1:
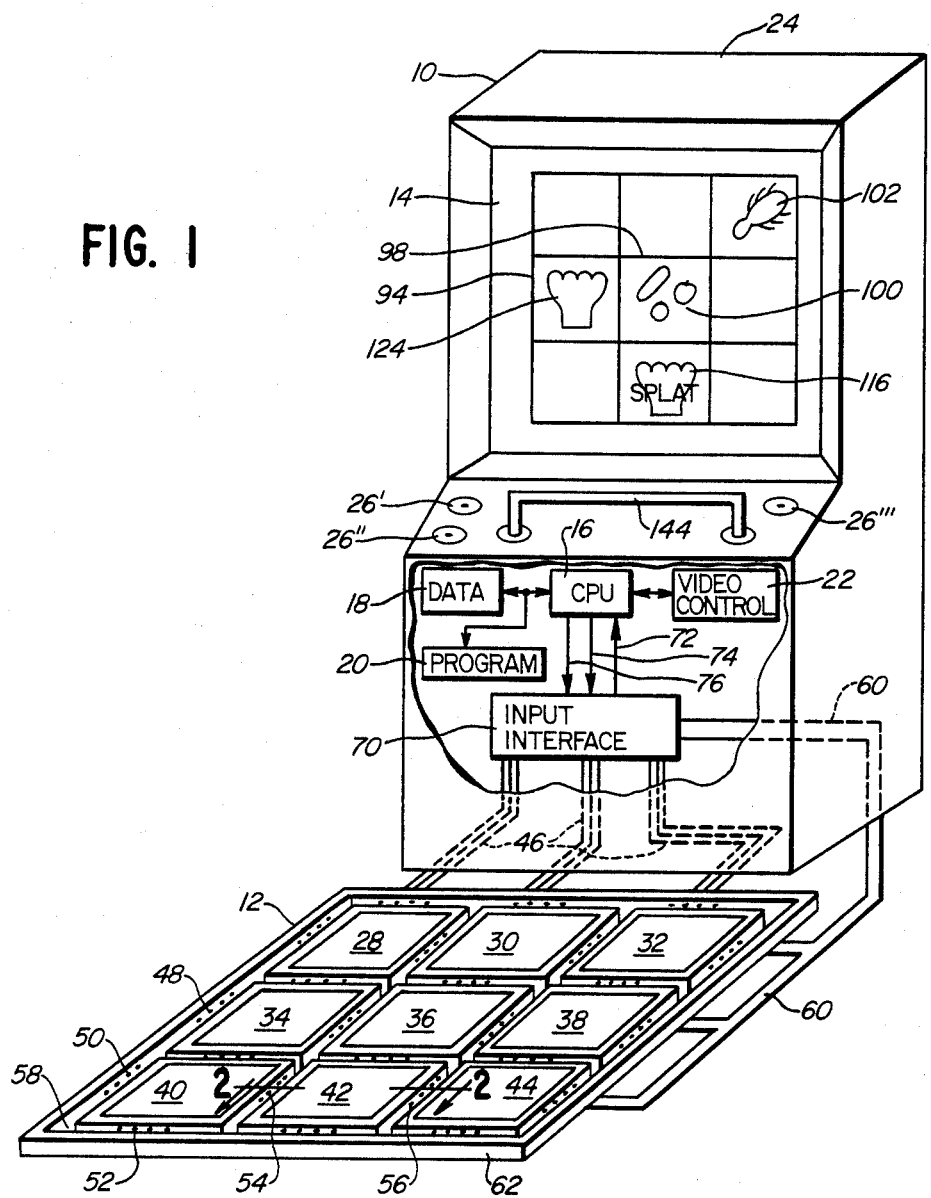
FIG. 1 is a perspectiv view of a video game or exercise system with a floor controller.

FIG. 1 is an illustration of a video game unit 10 having a floor controller 12 which represents the preferred embodiment of the invention. The video game unit 10 itself is in most respects a conventional video game unit that includes: a video display 14, a microprocessor 16, a random access data memory 18, a read only memory program 20, and a video control circuit 22, all of which is enclosed within a housing 24. The video game unit also includes a hand operated controls, represented at $26^1$, $26^{11}$, and $26^{111}$. A suitable video game unit is the SAC I unit which is commercially available from Bally Sente, Inc.

The apparatus in FIG. 1 differs from other video game apparatus in that it includes the floor controller 12 which generates input signals to the video game unit 10 that represent the location of an operator's feet. To that end the floor controller includes, in the preferred embodiment of the invention, an array of weight sensitive pads 28–44 arranged in a three by three matrix. Signals are generated by the pads 28–44 whenever an operator stands on one of the pads. The signal representing which pad or pads the operator is standing upon is transmitted to the game unit 10 over one or more of a group of nine signal lines all of which are indicated by reference numeral 46. Each of the signal lines 46 run from an individual pad such as 28 to the game unit 10.

Along with the pads 28–44 the floor controller 12 includes a plurality of light segments, symbolically represented in FIG. 1 by dots, such as the dots identified by reference numerals 48–56. The light segments, preferably including four lights in each segment, are secured within a slot member 58 which is configured to encompass each of the pads 28–44. The light segments, e.g. 48–56, are selectively switched on under control of the processor unit 16, as will be described in detail later, during the playing of the game. For example in one embodiment of the invention the light segments surrounding a pad upon which an operator is standing are lighted. The light segments can also be randomly lighted in an attract mode when the game is not being played. Power is selectively applied to each of the light segments in response to signals from the game unit 10 transmitted over lines indicated by reference numeral 60. In the embodiment of the invention shown in FIG. 1 there will be twenty four light segments and thus twenty four lines 60.

Figure 2:
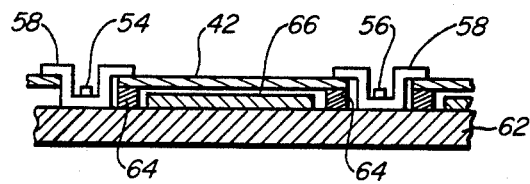
FIG. 2 is a sectional view of a portion of the floor controller of FIG. 1 taken along line 2—2.

A sectional view of one 42 of the weight sensitive pads is provided in FIG. 2. The pad 42 is supported on a base member 62 by a resilient foam member 64 and the slot member 56. When weight is applied to the pad 42 it is deflected downwardly activating a membrane switch 66. In the preferred embodiment of the invention there are three membrane switches aligned in a parallel arrangement for each pad.

Figure 3:
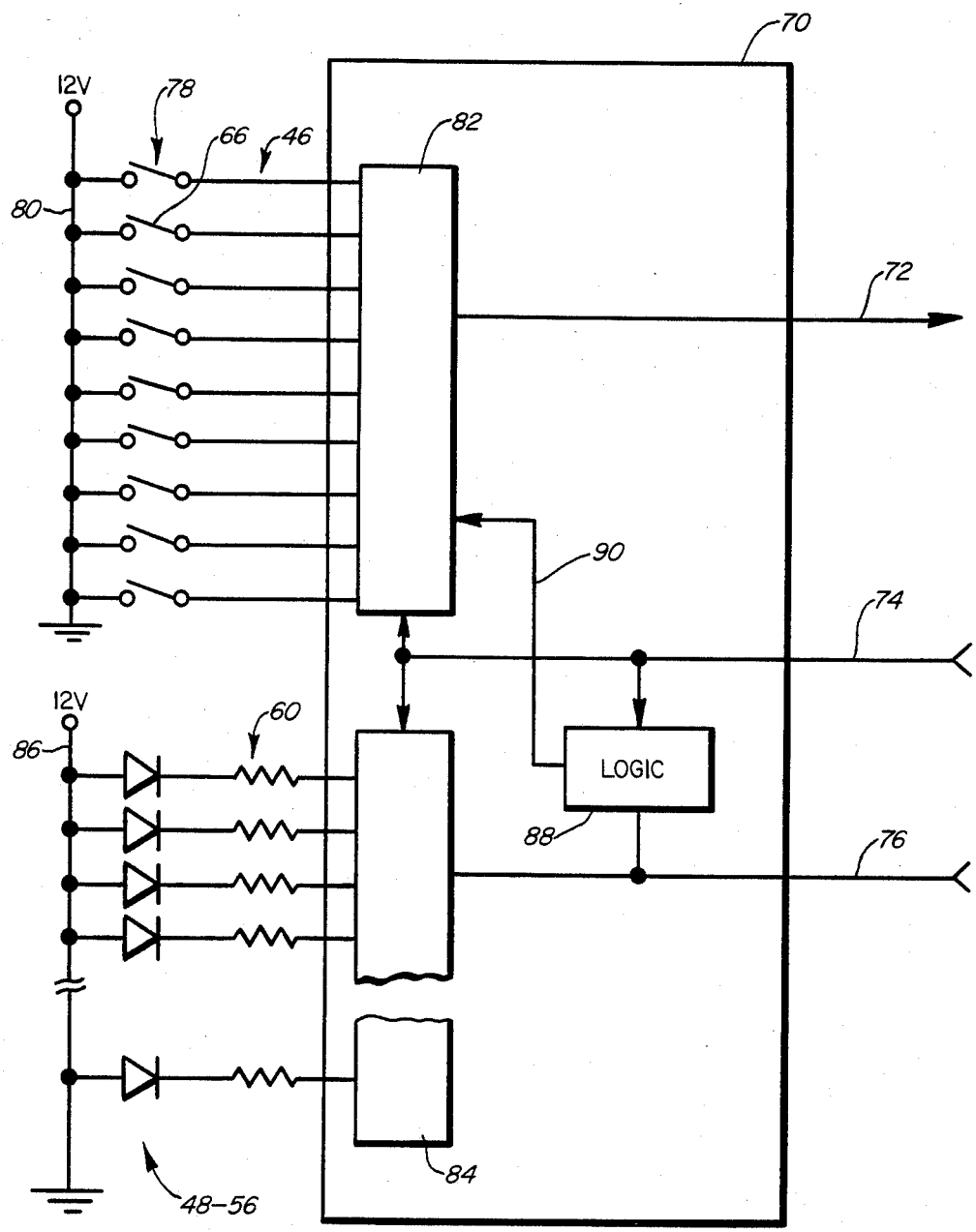
FIG. 3 is a schematic diagram of the input interface circuit of FIG. 1.

In order to receive the location signals from the pads 28–44 over lines 46, the video game unit 10 includes an input interface circuit 70 that communicates with the processor 16 over lines 72, 74 and 76. A schematic diagram of the preferred embodiment of the interface circuit 70 is provided in FIG. 3. Represented generally by reference numeral 78 are nine switches which correspond to the membrane switches, such as switch 66, associated with each of the pads 28–44. A twelve volt power supply is connected to a line 80 such that when one of the membrane switches is closed in response to an operator's weight being applied to a pad, a signal is transmitted over one of the lines 46 to a nine bit shift register 82. Periodically the contents of the shift register are transmitted to the CPU 16 over the line 72 in a nine bit stream. The signals on line 72 represent the location of an operator's feet on the floor controller 12 so that the relative location of the feet can be displayed by the CPU 16 on the CRT 14.

Also included in the input interface circuit is a twenty four bit shift register 84 that receives a twenty four bit stream over line 76 from the CPU 16. The purpose of the register 84 is to control the lighting of the twenty four light segments 48-56 et al. A twelve volt power supply is connected by line 86 to each segment and the corresponding bit status in register 84 will cause the light segment, represented in FIG. 3 by the diodes 48-56, to light or not to light. In this manner the CPU 16 can control the light segments.

Both of the shift registers are clocked under CPU 16 control over line 74. Included in the interface circuit 70 is a logic circuit 88 that serves by means of line 90 to latch the shift register 82 when the CPU 16 is reading the output of the register 82 over line 72.

Figure 4:
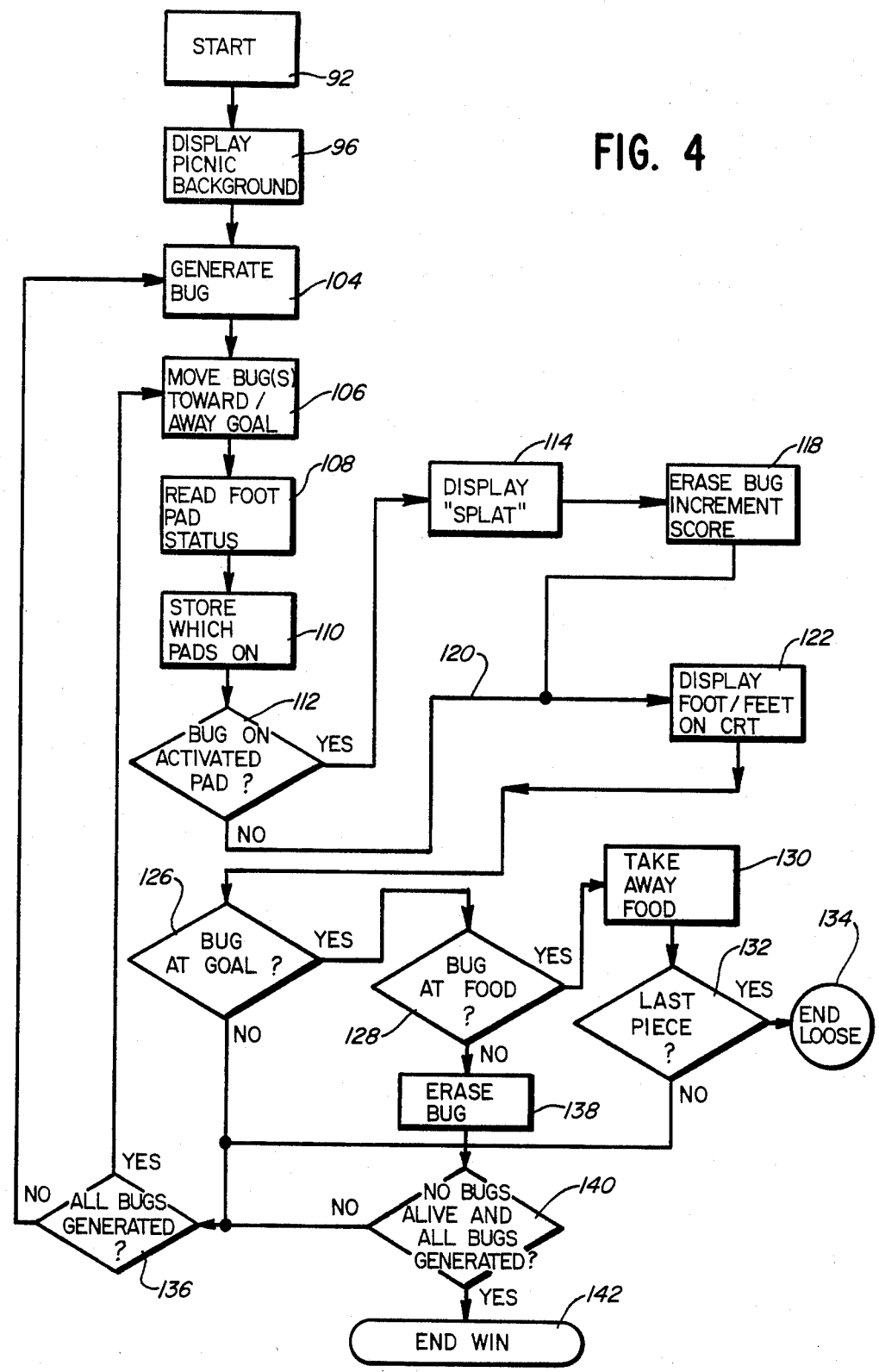
FIG. 4 is a flowchart of the logic of a particular video game that utilizes the floor controller.

An example of logic for a video game suitable for use with the floor controller 12 is illustrated in FIG. 4. After the game has been started 92, a representation of a picnic ground or alternatively of a kitchen floor, shown as nine squares at 94 in FIG. 1, is displayed 96 as a background for the game. In the center square 98 is a display of food 100.

The CPU 16 then generates a first bug 102 which can be termed a game object as shown at step 104 and then at 106 moves the bug towards "goal". For the purpose of this game "goal" is defined as either the food 100 or the edge of the picnic display 94. After the bug or bugs 102 have been moved 106, the CPU 16 as indicated at 108 reads the status of the pads 28-44 to determine if the operator is standing on any of the pads. The status is then stored as shown by block 110 in data memory 18.

In the next step 112, the CPU 16 compares the location of the bugs with the activated pads. If a bug is on one of the picnic squares 94 corresponding to a pad upon which the operator is standing or "stompin'", the word "splat" is generated at block 114 over the outline of a foot. An example of this display is shown at 116 of FIG. 1. The bug in this square is then erased and the operator's score is incremented as indicated by block 118. On the other hand if there are no bugs 102 on the display squares 94 corresponding to the activated pads as indicated by line 120 in FIG. 4, the CPU 16 will display as per logic block 122 the relative locations of the operator's feet as shown for example at 124 of FIG. 1. Such a display 124 can be termed a location object.

A determination is then made 126 as to whether a bug is at one of the goals. If it is at a goal, it is then tested at 128 to see if it is at the food 100. If it is, then a portion of the food is removed 130 and if it is also the last piece of food as tested by block 132 the game ends at 134 with the operator losing. On the other hand if it is not the last piece, the game proceeds to logic block 136.

Returning to logic block 128, and it is determined that the bug is not at the food 100, it is assumed that the bug is at the edge 94 of the picnic display and the bug is erased at step 138. Then the CPU 16 tests at logic block 140 for the condition of no bugs left and that all of a predetermined number of bugs have been generated. If this test is true then the game ends with the operator declared a winner as shown by block 142.

In the event none of the tests performed at blocks 126, 132 and 140 are true, a determination if all of the predetermined number of bugs have been generated is made at block 136. Depending on the results of this test, a new bug is generated at 104 or the existing bugs are moved by the logic at 106 and the game continues.

As described above the floor controller 12 permits the creation of entirely new types of video games that use as input the location of the operator's feet. However, in addition to new types of games, the invention can provide for substantial physical activity on the part of the operator. In fact, the rapid foot movement required to be successful in playing the game illustrated in FIG. 4, makes it desirable in the preferred embodiment of the invention to provide a handle 144 secured to the housing 24 so that the operator can steady himself during play.

As well as being viewed as a video game, the apparatus of FIG. 1 can be considered as an exercise apparatus. The processor 16 can be programmed to provide a specific exercise program wherein the video display 14 provides direction for the placement of the operator's feet on the floor controller 12 and the location signals 46 are used by the processor 16 as a measure of success of the operator in following the exercise program. This general concept is illustrated by the game logic of FIG. 4 wherein the operator is encouraged to place his feet on specified pads on the floor controller 16 in response to the generation of the bugs 102 on the display 14. The bugs 102 in the context of an exercise apparatus can be termed exercise objects. As an exercise apparatus, the floor controller can be modified to include, for example, only three weight sensitive pads 34, 36 and 38 that can be used in an in-place jogging exercise program.

It is therefore apparent that the apparatus including the floor controller 12 of FIG. 1 can be configured in various ways to provide a wide variety of exercise systems that respond to the location of an operator's feet as well as a video game.

We claim:
1. A video game apparatus comprising:
a video display;
processor means for controlling said video display;
a program memory, containing instructions to operate the apparatus, operatively connected to said processor means;
an input interface operatively connected to said processor means; and
a floor controller including a plurality of weight sensitive pads, operatively connected to said input interface, for generating location signals representing the relative location of at least one of a game operator's feet wherein said processor means responds to said location signals to control said video game.

2. The apparatus of claim 1 wherein said pads are arranged in an array.

3. The apparatus of claim 2 wherein said array is configured in a three by three matrix of said pads.

4. The apparatus of claim 2 wherein said processor means includes means responsive to said location signals for generating objects on said video display located on said display corresponding to one of said pads bearing weight of one of said operator's feet.

5. The apparatus of claim 1 additionally including light segments disposed to the sides of said pads wherein said segments are selectively lighted by said processor means.

6. The apparatus of claim 1 wherein said input interface includes memory means operatively connected to said pads for storing a signal indicating whether or not weight has been applied to each of said pads.

7. The apparatus of claim 6 wherein said memory means includes a shift register wherein each of said pads is connected to said shift register.

8. The apparatus of claim 7 wherein said shift register periodically, under the control of said processor means, transmits a bit stream to said processor means wherein each bit in said stream indicates the weight bearing status of a predetermined one of said pads.

9. The apparatus of claim 8 additionally including a plurality of light segments associated with said pads and wherein said input interface includes a second shift register, operatively connected to each of said light segments and said processor means, effective to light a predetermined group of segments associated with one of said pads.

10. The apparatus of claim 9 wherein said processing means periodically transmits to said second shift register a second bit stream wherein each bit represents the on or off status of one of said light segments.

11. The apparatus of claim 10 wherein said pads are rectangular in shape and are configured in a three by three matrix array and with one of said segments located adjacent to each side of each of said pads.

12. The apparatus of claim 1 wherein said processor means includes:
means for generating at least one game object on said video display; and
means for generating on said video display at least one location object in response to said location signals.

13. The apparatus of claim 12 wherein said processor means includes means for determining the coincidence of one of said game objects and one of said location objects on said video display.

14. The apparatus of claim 13 wherein said processor means includes means for causing the disappearance or alteration of said one of said game objects upon said coincidence.

15. The apparatus of claim 14 wherein said location object is displayed as an image of a foot.

16. The apparatus of claim 15 wherein said game objects are displayed as an image of a small animal.

17. The apparatus of claim 1 wherein said processor means includes means responsive to said location signals for generating objects on said video display located on said display as a function of the location of said operator's foot on said floor controller apparatus.

18. The apparatus of claim 1 additionally including a housing having a handgrip that said operator can steady himself with while playing.

19. A video exercise apparatus comprising:
a video display;
processor means for controlling said video display;
program memory, containing instructions to operate the exercise apparatus as an exercise device, operatively connected to said processor means;
a floor controller including a plurality of weight sensitive pads, responsive to the location of an operator's feet, operatively connected to said processor means for generating location signals representing the location of an operator's feet; and
wherein said processor means generates displays on said video display in response to said location signals and said instructions effective to designate on said display positions for the operators feet in order to affect an exercise program for the operator.

20. The apparatus of claim 19 wherein said pads are arranged in an array.

21. The apparatus of claim 19 additionally including light means associated with said pads and responsive to the application of weight to a pad for producing a lighted indicia associated with said pad that weight is being applied to said pad.

22. The apparatus of claim 19 wherein said processor means includes means responsive to said location signals for generating objects on said video display located on said display corresponding to one of said pads bearing weight of one of said operator's feet.

23. The apparatus of claim 19 wherein said processor means includes:
means for generating at least one exercise object on said video display; and
means for generating on said video display at least one location object in responsive to said location signals.

24. The apparatus of claim 23 wherein said processor means includes means for determining the coincidence of one of said exercise objects and one of said location objects on said video display.

25. The apparatus of claim 24 wherein said processor means includes means for causing the disappearance or alteration of said one of said exercise objects upon said coincidence.

26. The apparatus of claim 19 wherein said processor means includes means responsive to said location signals for generating objects on said video display located on said display as a function of the location of said operator's foot on said floor controller apparatus.

27. The apparatus of claim 19 additionally including a housing having a handgrip that said operator can steady himself with while exercising.

* * * * *